United States Patent [19]

Otruba

[11] Patent Number: 5,413,651
[45] Date of Patent: * May 9, 1995

[54] UNIVERSAL ROLL-FED LABEL CUTTER

[75] Inventor: Svatoboj Otruba, Ceres, Calif.

[73] Assignee: B&H Manufacturing Company, Ceres, Calif.

[ * ] Notice: The portion of the term of this patent subsequent to Jan. 10, 2012 has been disclaimed.

[21] Appl. No.: 36,059

[22] Filed: Mar. 23, 1993

[51] Int. Cl.⁶ .................. B26D 5/00; B32B 31/00
[52] U.S. Cl. .................. 156/64; 156/351; 156/353; 156/354; 156/521
[58] Field of Search .................. 156/64, 353, 514, 265, 156/267, 521, 351, 354

[56] References Cited

U.S. PATENT DOCUMENTS

| | | | |
|---|---|---|---|
| 3,601,587 | 8/1971 | Thiede | 235/92 CC |
| 3,801,408 | 4/1974 | Kuring et al. | 156/552 |
| 4,108,710 | 8/1978 | Hoffmann | 156/450 |
| 4,108,711 | 8/1978 | Hoffman | 156/497 |
| 4,181,555 | 1/1980 | Hoffman | 156/353 |
| 4,221,144 | 9/1980 | Diesch et al. | 83/27 |
| 4,236,955 | 12/1980 | Prittie | 156/353 |
| 4,264,957 | 4/1981 | Pautzke | 364/469 |
| 4,293,774 | 10/1981 | Pongracz | 250/548 |
| 4,316,566 | 2/1982 | Arleth et al. | 226/2 |
| 4,361,260 | 11/1982 | Hanlan | 226/30 |
| 4,519,868 | 5/1985 | Hoffmann | 156/353 |
| 4,552,608 | 11/1985 | Hoffmann et al. | 156/351 |
| 4,618,391 | 10/1986 | Tovti et al. | 156/353 |
| 4,985,096 | 1/1991 | Bekker-Madsen | 156/64 |
| 5,017,257 | 5/1991 | Murphy | 156/353 |

FOREIGN PATENT DOCUMENTS

| | | |
|---|---|---|
| 0009739 | 4/1980 | European Pat. Off. . |
| 0011595 | 5/1980 | European Pat. Off. . |
| 0011967 | 6/1980 | European Pat. Off. . |
| 0074165 | 3/1983 | European Pat. Off. . |
| 3015281 | 10/1981 | Germany . |
| 3137201 | 3/1983 | Germany . |
| 2074533 | 11/1981 | United Kingdom . |
| 2096795 | 10/1982 | United Kingdom . |

OTHER PUBLICATIONS

Gallus, A New Module For Rational Label Manufacture: The Sheet Cutting Unit And Instruction Manual, 1978.

Primary Examiner—David A. Simmons
Assistant Examiner—Paul M. Rivard
Attorney, Agent, or Firm—Brooks & Kushman

[57] ABSTRACT

A universal label cutter apparatus and method for feeding labels from a roll of label material and cutting labels of various lengths and materials. The label cutter apparatus including a microprocessor controlled drive system employing separate and independent servomotors for driving a feed roller, a cutter drum, and a vacuum drum at different speeds. The microprocessor being programmable to vary the rotational speed of the cutter drum during each label cutting cycle in order to optimize control of the label during cut off and transfer to the vacuum drum.

10 Claims, 3 Drawing Sheets

UNIVERSAL ROLL-FED LABEL CUTTER

TECHNICAL FIELD

This invention relates to a labeling machine controlled by a digital microprocessor, and more particularly to a labeling machine having servomotors independently controlling operative elements of a labeling machine.

BACKGROUND ART

In conventional labeling machines, mechanical elements are used to synchronize label feed, label cutoff and label application operations. One example of a mechanically synchronized labeling machine is disclosed in U.S. Pat. No. 4,108,710 to Hoffmann. The cost of mechanical timing gears and chains is a significant portion of the cost of labeling machines. The dedicated hardware elements of such systems makes it impractical to convert labeling machines from one style of article to another. To make a significant change in the size of labels applied or change the size of the cutter or vacuum drum, it is necessary to completely re-engineer the mechanical timing elements. Frequently, new gear drives or timing mechanisms must be developed to make such changes.

In an effort to improve on mechanically synchronized labeling machines, digitally controlled label feed rolls have been developed. An example of such an apparatus is disclosed in U.S. Pat. No. 4,552,608 to Hoffmann et al in which a digital data processing system senses the position of the cutter and controls a feed roller which is driven by a stepper motor. The rotational speed of the feed roller is controlled by the stepper motor. The machine operator provides inputs representative of the label length and location of registration marks with an optical sensor. While this approach provides some important advantages, the system disclosed is subject to several problems. First, stepper motors have limited precision and limited maximum speed which do not allow for instantaneous control of speed. Stepper motors are also generally fairly limited in horsepower and require complex and expensive power supplies. This approach also requires mechanical coupling between the cutter and the vacuum drum and a complicated gear system for timing the application of labels to containers.

A web registration control system disclosed in U.S. Pat. No. 4,361,260 to Hanlan discloses an electronic control for a web handling apparatus for cutting a web into segments. The web is driven by pinch, or nip, rollers having speed control based upon a registration mark which controls the location of the cut made by a cutter. The complex circuitry controls label feed and cut-off by means of a speed correction circuit. There is no disclosure of any system for varying the speed of the cutter for precise cut-off performance or for varying the speed of the cutter for smooth label segment transfer.

In general, label cutter mechanisms are designed to operate at a constant speed to cut a particular size of label. It has been discovered that label cut-off is optimized when the label speed and surface speed of the label cutter are matched during the cutting step. The surface speed of the vacuum drum is greater than the average speed of the label web because individual labels are spaced from each other on the vacuum drum. Ideally, label segments should move at the same speed as the vacuum drum at the time of label transfer. With conventional systems, system optimization is not possible because the optimum speed of the cutter during label transfer is different than the optimum speed for label cut-off.

Label cutter performance is affected by many factors including the type of label material to be cut. Label materials currently available include paper, polystyrene foam and various films including polystyrene, polypropylene and polyethylene. Foam and paper materials are easily handled under tension and are generally easier to handle than films which stretch. One of the most inexpensive types of films is polyethylene; however, it has not been considered useable for container labeling because of its tendency to stretch and distort under application of tension forces. While it is generally preferred to have a limited amount of tension on the label web during the cutting operation, the amount of tension that can be applied to a polyethylene web is extremely limited.

Once labels have been severed by the cutter, they are individually handled and supported by a vacuum drum. The vacuum drum in prior art labeling machines is preferably rotated at a higher rate of surface speed than the surface speed of the cutter. If not properly set, the vacuum drum can snap the label segment from the cutter, causing the label to shift. If the label shifts during transfer, it can result in misalignment of the label on the container.

These and other problems encountered by the prior art are addressed by the invention which is summarized below.

SUMMARY OF THE INVENTION

It is an object of the present invention to provide a labeling machine in which the motor driven elements in the roll-fed label web path, the label cutter and each of the motor driven elements in the severed label segment path are independently controlled by a microprocessor through separate servomotors.

It is another object of the invention to provide a microprocessor for controlling the rotational speed of a cutter drum so that it rotates a cutter blade in substantial synchronism with the feed rate of the label web during the label cut. The rotational speed of the cutter drum then increases to substantially match the speed at which the severed segment travels with the higher surface speed of the vacuum drum. Upon transfer of the label to the vacuum drum, the cutter drum rotational speed is reduced so that the cutter blade may be substantially synchronized again with the label feed rate.

It is also an object of the invention to provide a microprocessor for controlling the variable rate at which label material is fed to the cutter while rotating the cutter at a substantially constant speed.

A further object of the invention is to provide a labeling machine which provides separate microprocessor control of servomotor driven elements in the web and segment handling paths of the labeling machine so that timing relationships between various driven elements can be independently controlled. Through separate control, a differential between the label web feed rate and the cutter drum rotation rate can be maintained so that proper tension on the label material can be maintained throughout the process. Similarly, with materials which tend to stretch non-elastically under significant tension, such as polyethylene, independent control can allow for elimination of any significant tension on the label web.

It is another object of the invention to provide a system wherein rapid changeover from one type of label to another can be accomplished by changing driven components such as the cutter drum, vacuum drum and star wheel and then merely reprogramming the microprocessor to reestablish machine timing relationships. In this way, different containers can be labeled by the same base machine. A reduction in the number of different types of cutters and vacuum drums can be achieved, resulting in significant savings.

It is yet another object of this invention to provide a universal cutter which eliminates the need for costly mechanical timing elements and wherein a single cutter mechanism can be used with a wide variety of labeling machines.

The above objects, features and advantages of the present invention, as well as others, are readily apparent from the foregoing detailed description of the invention in view of the drawings.

BEST MODE FOR CARRYING OUT THE INVENTION

Figure 1:
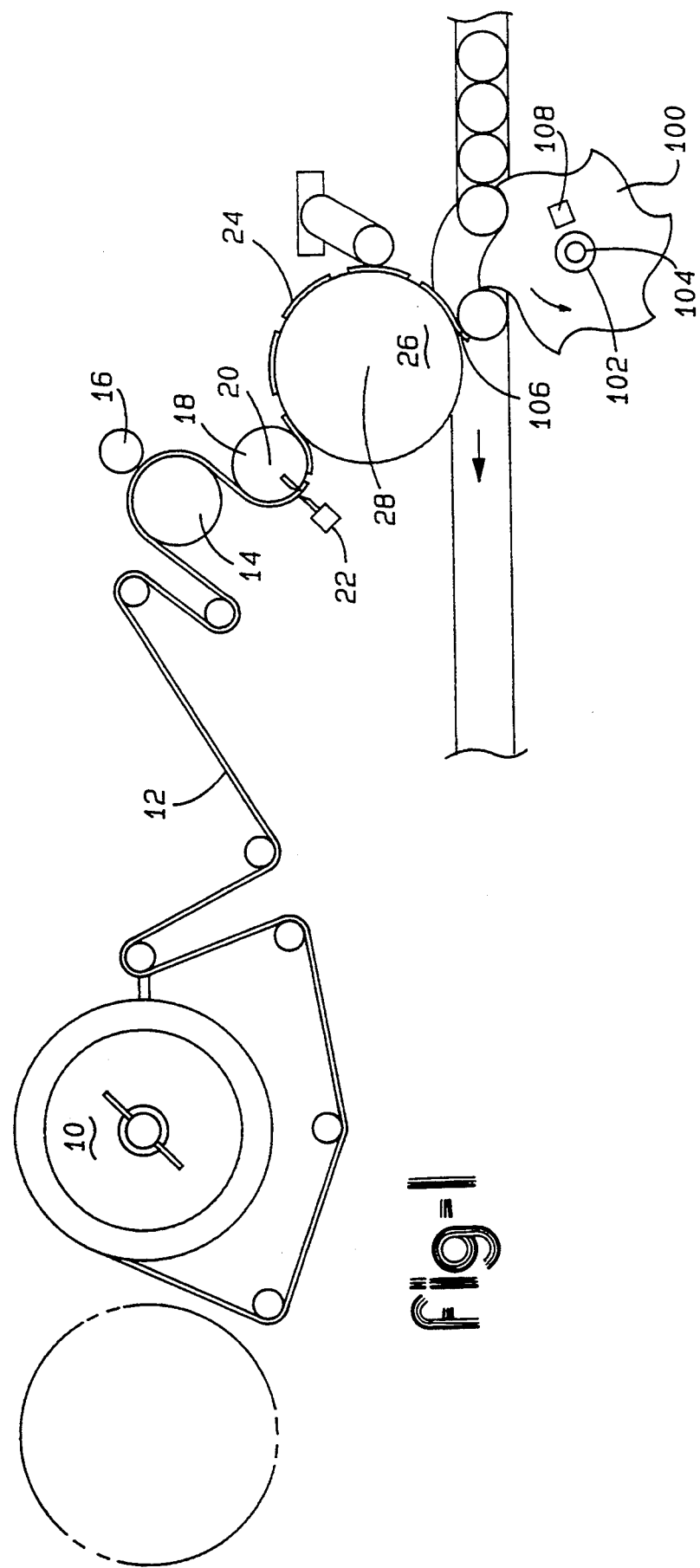
FIG. 1 is a schematic plan view of a label feed and cutting mechanism for a universal roll-fed label cutter made in accordance with the present invention.
Figure 2:
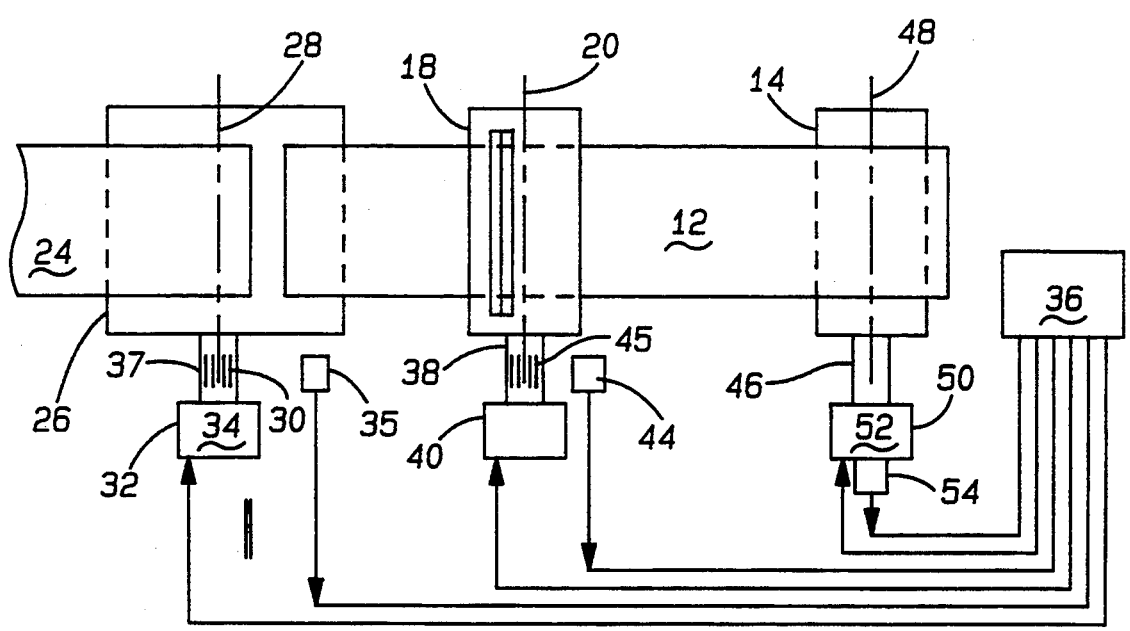
FIG. 2 is a schematic elevational view of a label feed and cutting mechanism for universal roll-fed label cutter made in accordance with the present invention.

Referring to FIGS. 1 and 2, a label roll 10 is shown which unwinds to create a label web or strip 12. The label strip 12 is fed between a feed roller 14 and a pressure roller 16. The label strip 12 is contacted by the outside surface of the feed roller 14 and pressure roller 16. Each of the cylindrically shaped rollers 14 and 16 is translationally fixed relative to one another, but each rotates about an axis.

In the illustrated embodiment, the label strip 12 and label segments 24 are fed through feed drums which rotate about a vertical axis which is the normal orientation for labelling bottles. The universal roll-fed label cutter could also be oriented with the labels fed through feed rollers which rotate about an horizontal axis which is the normal orientation for labelling cans.

The label sheet is fed around a cutter drum 18 and is placed in contact with the outside surface of the cutter drum 18. Cutter blade 22 extends in a generally vertical relationship from the periphery of the cutter drum 18. Blade 22 cuts label strip 12 into individual label segments, or labels, 24. Cutter drum 18 is generally cylindrical in shape and is rotatable about its central axis 20.

Individual labels 24 are fed onto a vacuum drum 26, and held on the outer surface of the vacuum drum 26 by vacuum pressure. U.S. Pat. No. 4,108,710 is hereby incorporated by reference for its disclosure of a means of maintaining contact between the labels 24 and the vacuum drum 26 using vacuum pressure. The vacuum drum 26 is also fixed translationally relative to the cutter drum and rotates about its central axis 28.

Vacuum drum shaft 30 is fixed to the vacuum drum 26 with the lower end 32 of the vacuum drum shaft 30 protruding from the bottom of the vacuum drum 26. The lower end 32 of the vacuum drum shaft 30 is rotationally coupled to a vacuum drum servomotor 34. It is understood that the vacuum drum servomotor 34 could also be mounted on top of the vacuum drum shaft 30. The vacuum drum servomotor 34 drives the vacuum drum shaft 30 and rotates the vacuum drum 26. The vacuum drum servomotor 34 is electrically connected to a microprocessor 36, which controls the speed and position of the vacuum drum servomotor 34. The speed and position is monitored by a vacuum drum encoder 35 which detects optical lines 37 on the vacuum drum shaft 30 and transmits a signal to the microprocessor 36.

A cutter drum shaft 38 is fixed to the cutter drum 18. The cutter drum 18 is adapted to rotate about the cutter drum central axis 20 such that the bottom end 40 of the cutter drum shaft 38 protrudes from the cutter drum 18. The bottom end 40 of the cutter drum shaft 38 is rotationally coupled to a cutter drum servomotor 42. The cutter drum servomotor 42 drives the cutter drum shaft 38 and, consequently, rotates the cutter drum 18. This cutter drum servomotor 42 is also electrically connected to the microprocessor 36, which controls the speed of the cutter drum servomotor 42. The speed is monitored by a cutter drum encoder 44 which detects optical lines 45 on the cutter drum shaft 38 and transmits a signal to the microprocessor 36.

A feed roller shaft 46 is secured to the central axis 48 of the feed roller 14 with the bottom end 50 of the feed roller shaft 46 protruding from the feed roller 14. The bottom end 50 of the feed roller shaft 46 is rotationally coupled to a feed roller servomotor 52, which drives the feed roller shaft 46 and, consequently, the feed roller 14. Feed roller servomotor 52 is electrically connected to the microprocessor 36, which controls the speed of the feed roller servomotor 52. Feed roller encoder 54 detects the speed and position of the feed roller shaft 46 and communicates this to the microprocessor 36.

An Ormec processor, Model GEM III, using an Intel 80286 microprocessor can be programmed to control individual AC brushless servomotors according to the desired strategy.

In operation, as the label strip 12 unwinds from the label roll 10, the feed roller 14 moves and locates the strip 12. As strip 12 is fed across the surface of the cutter drum 18, the cutter blade 22 cuts each individual label 24 from the label strip 12 once every label cutting cycle. Thereafter, the label is fed onto the vacuum drum 26, which pulls the label 24 away from the cutter drum 18 and orients the label 24 for the next step in the labelling process. Feed roller 14, cutter drum 18 and vacuum drum 26 rotate at controlled speeds which may be varied or constant depending upon labeling requirements.

Figure 3A:
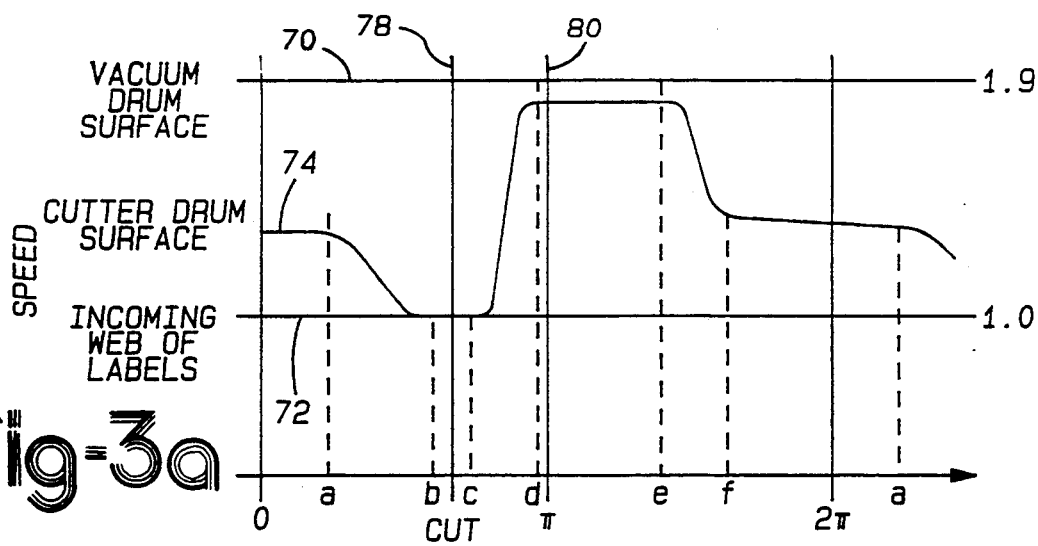
FIG. 3A is a graphical representation of the timing of driven elements in the web and label segment paths of a labeling machine through two label cutting and transfer cycles.

FIG. 3 shows one example of how different rotational speeds of the motor driven elements of the labeler may be varied throughout a label cutting cycle 68. As used herein, the term "rotational speed" should be construed to mean the speed of the outer surface of the particular drum or roller at the location where it makes contact with the label strip 12 or label 24. For example, a drum rotating at twice the number of rotations per minute as a second drum of twice the diameter of the first drum would have the same rotational speed at its outer surface. The label cutting cycle 68 lasts from one pass of a cutting blade across the label strip 12 to the next. For example, for a single blade cutter drum 18, one label cutting cycle 68 occurs for each 360 degree rotation of the cutter drum 18.

The vacuum drum rotational speed 70 is preferably maintained by the vacuum drum servomotor 34 at a generally constant rotational speed throughout a label cutting cycle. The label feed rate 72, defined as the rate that the label strip 12 is reeled off of the label roll 10, is less than the vacuum drum rotational speed 70. According to one aspect of the invention, the cutter drum rotational speed 74 and the feed roller rotational speed shown as shaded region 76 are controllably varied throughout the label cutting cycle 68.

Cutter blade 22 contacts the label strip 12 at point 78 of the cycle. At point 78, the cutter drum rotational speed 74 is at a lower speed such as a speed substantially equal to the overall label feed rate 72. This substantial matching of speeds allows labels 24 to be cut from the label strip 12 without stretching, resulting in clean cuts. The rotational speed 74 of the cutter drum 18 then increases rapidly until it approaches the point 80 in the label cutting cycle when label 24 is transferred from the cutter drum 18 to the vacuum drum 26. At point 80, the cutter drum rotational speed 74 is slightly less than the vacuum drum rotational speed 70. This allows for smooth transfer of the label 24 from the cutter drum 18 to the vacuum drum 26 without snapping. The cutter drum rotational speed 74 is reduced thereafter and levels off between the vacuum drum rotational speed 70 and the overall label feed rate 72 before starting the label cutting cycle 68 over again for the next label.

Figure 3B:
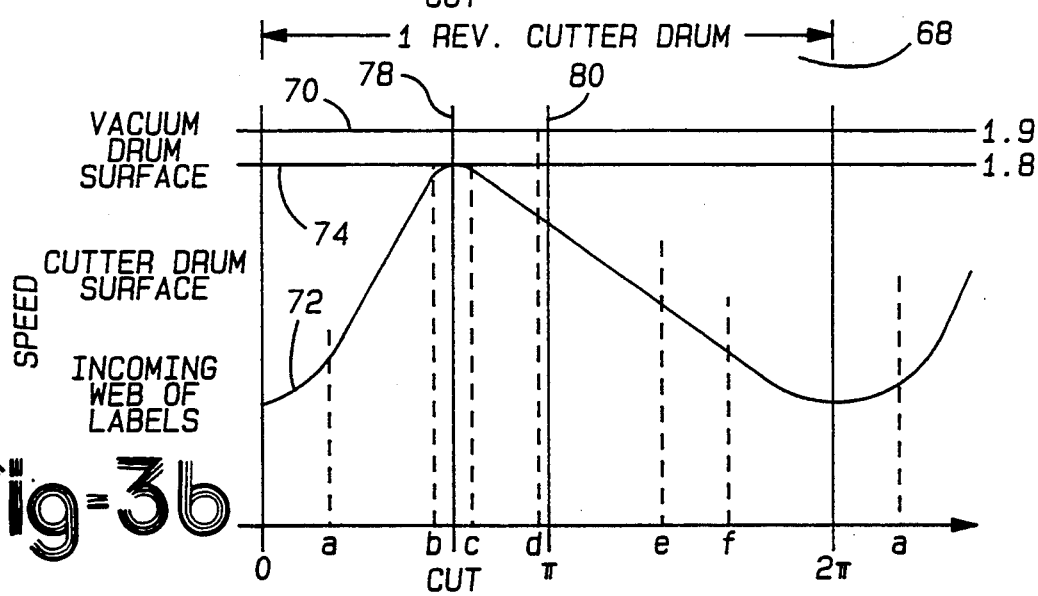
FIG. 3B is an alternative graphical representation of the timing of driven elements in the web and label segment paths of a labeling machine through two label cutting and transfer cycles.

Referring now to FIG. 3B, an alternative embodiment of the method of the invention is shown wherein the label feed rate 72 varies throughout the label cutting cycle while the cutter drum rotational speed 74 and vacuum drum rotational speed 70 remain substantially constant. An advantage of this embodiment is that control of the feed rollers by several motors is easier than controlling the speed of the cutter drum due to the lower inertia of the smaller feed rollers. The speed of the incoming web of labels 72 must on the average be less than the speed of the vacuum drum surface to provide spacing between labels. However, the speed of the web and cutter drum surfaces are advantageously matched when the segments are cut from the strip of label 12. The rotational speed of the cutter drum surface shown at 74 is maintained slightly less than the speed of the vacuum drum rotational speed so that tension is maintained on the label surface throughout the label transfer.

Figure 3C:
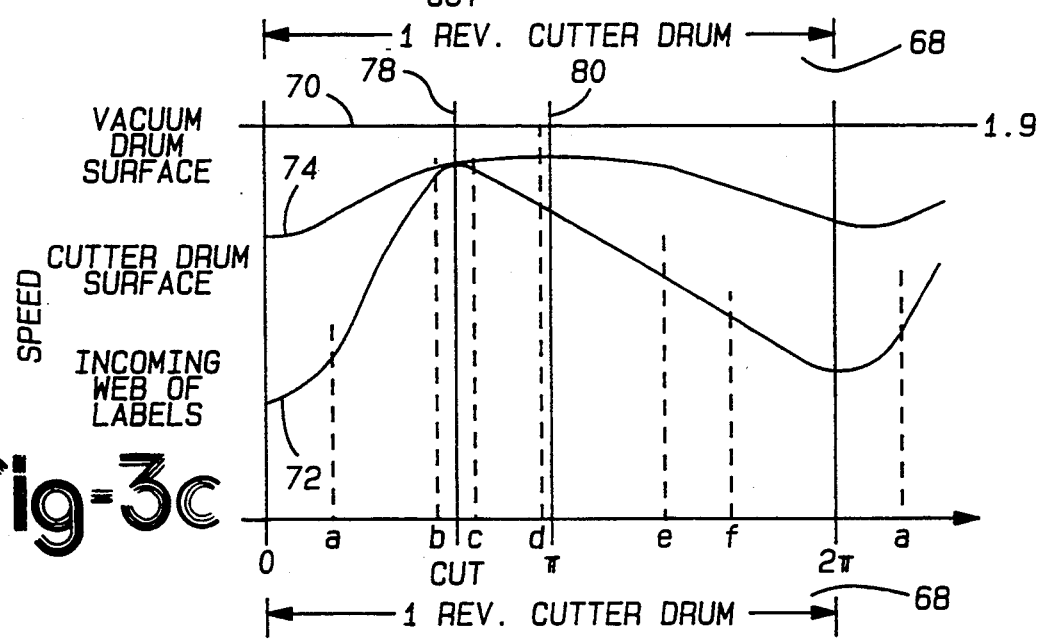
FIG. 3C is an alternative graphical representation of the timing of driven elements in the web and label segment paths of a labeling machine through two label cutting and transfer cycles.

Referring now to FIG. 3C, another alternative embodiment of the invention is shown wherein the speed of the cutter drum surface and incoming web of labels are both varied throughout the label cutting cycle. Again, the speed of the incoming web of labels and cutter drum surface are matched at the point 78 at which the label strip is cut into label segments 24. After cut-off, the speed of the incoming web of labels is limited to slow down while the cutter drum surface speed is maintained at its relatively high level approaching the speed of the vacuum drum surface during the label transfer step.

The label feed speed 72 may track the cutter drum rotational speed 74 throughout the cycle, but typically at a slightly slower rate. This provides for slight tensioning in the label strip 12 at all times to aid in aligning and cutting. The difference between the rotational speed of the feed roller 14 and the cutter drum 18 is determined by the properties of the label material. For example, polyethylene stretches very easily and therefore allows only a minimal amount of pull to maintain the tension necessary for alignment. The rotational speeds 72,74 for polyethylene is optimized by requiring the label feed speed 72 to closely match the cutter drum rotational speed 74. For other materials which do not stretch as easily as polyethylene, the feed roller rotational speed need not be as closely matched for satisfactory results.

The cutter drum may have one, two, three or more cutter blades affixed to its outer surface. If multiple cutter blades are provided, the cutter drum will have a correspondingly larger diameter. This allows for a reduction in the number of revolutions of the cutter drum for producing a given number of labels and reduces loads on the cutter drum servomotor. A larger cutter drum can be utilized by changing input parameters to the microprocessor without needing to change a complicated gear arrangement. Similarly, a change in the vacuum drum size or a change in the spacing between labels on the vacuum drum can be implemented by changing input parameters to the microprocessor.

Another aspect of the invention is also illustrated in FIG. 1. A star wheel 100 may also be controlled by a separate servomotor 102. Star wheel 100 rotates about a fixed axis 104. The purpose of the star wheel 100 is to align and space the containers 106 prior to feeding the containers into contact with the vacuum drum 26 where the labels 24 are applied to the containers. A servomotor 102 and encoder 108 are connected to and drive the star wheel 100 similar to the way that servomotor 34 is connected to and drives the vacuum drum 26. Encoder 108 communicates with the microprocessor 36, which controls the speed of rotation of the star wheel 100 by controlling the servomotor 102. Microprocessor 36 controls the timing and spacing of containers 106 as they are fed to the vacuum drum 26, thus maintaining the proper timing without the need for a complicated mechanical gear arrangement. This aspect also permits the use of two, three, four or more stations on the vacuum drum 26.

While the best mode for carrying out the invention has been described in detail, those familiar with the art to which this invention relates will recognize alternative designs and embodiments for practicing the invention as defined by the following claims.

What is claimed is:

1. A labelling apparatus for feeding a strip of label material from a roll, cutting a plurality of label segments and preparing the label segments for application to a container, the apparatus comprising:

feed roller means for feeding a strip of labels at a controllable rate of speed, said feed roller means including a rotary mounted feed roller having a generally cylindrical shape and having a central axis about which it rotates, and further having first motor means for driving said feed roller, said first motor means including a first servomotor rotatably mounted to said feed roller for rotatably driving said feed roller about said feed roller central axis;

cutter means for cutting label segments from the strip of label material at predetermined length intervals, said cutter means rotating at a controllable rate of speed, said cutter means including a rotary mounted cutter drum having a generally cylindrical shape and having a central axis about which it rotates, and further having second motor means for driving said cutter drum, said second motor means including a second servomotor rotatably mounted to said cutter drum for rotatably driving said cutter drum about said cutter drum central axis;

vacuum drum means for supporting said label segments after being cut from the strip of label material, said vacuum drum means moving at a higher rate of speed than said feed roller means, said vacuum drum means including a rotary mounted vacuum drum having a generally cylindrical shape and having a central axis about which it rotates, and further having third motor means for driving said vacuum drum, said third motor means including a third servomotor rotatably mounted to said vacuum drum for rotatably driving said vacuum drum about said central axis; and microprocessor means for controlling the rate at which said feed roller means feeds said strip of labels to said cutter means, and for varying the cutter drum surface speed during distinct intervals of a label cutting cycle, the cutter drum having a lower surface speed during the interval in the cycle in which the cutter drum cuts a label, the cutter drum having a higher surface speed during the interval in the cycle in which the cutter drum transfers a cut label to the vacuum drum.

2. The apparatus of claim 1 further comprising:

a feed roller encoder means for sensing the surface speed and position of said feed roller, said feed roller encoder means electrically connected to said microprocessor means;

a cutter drum encoder means for sensing the surface speed and position of said cutter drum, said cutter drum encoder means electrically connected to said microprocessor means; and a vacuum drum encoder means for sensing the surface speed and position of said vacuum drum, said vacuum drum encoder means electrically connected to said microprocessor means.

3. The apparatus of claim 1 wherein said microprocessor means has an input means for inputting the length of labels being cut and a computing means for adjusting the speed of the second motor means in response to changes in the input length of labels.

4. The apparatus of claim 1 wherein said microprocessor means has an input means for inputting the type of label material being cut and a computing means for adjusting the speed of the first motor means to accommodate various label materials.

5. A method of operating a labeling machine which cuts individual labels from a roll of labels and applies them to containers, the labeling machine having means for continuously and independently controlling the surface speeds of a vacuum drum, a cutter drum, and a feed roller, the method comprising the steps of:

rotating the vacuum drum at a generally constant surface speed;

transporting a label strip off of the label roll at a label feed rate, said label feed rate being slower than the surface speed of the vacuum drum; and varying the cutter drum surface speed during distinct intervals of a label cutting cycle, the cutter drum having a lower surface speed during the interval in the cycle in which the cutter drum cuts a label, the cutter drum having a higher surface speed during the interval in the cycle in which the cutter drum transfers a cut label to the vacuum drum.

6. The method of claim 5 further comprising rotating the feed roller at varying surface speeds during distinct intervals of the label cutting cycle, the feed roller surface speed remaining slightly less than the cutter drum speed while tracking the surface speed of the cutter drum throughout the label cutting cycle.

7. The method of claim 5 further comprising controlling the surface speed of the feed roller to maintain proper tension on the label strip.

8. The method of claim 5 further comprising establishing said label cutting cycle as a 360° rotation of the cutter drum when the cutter drum is a single blade cutter drum.

9. An apparatus for cutting individual labels from a continuous roll of labels before applying them to containers, the apparatus comprising:

a microprocessor;

a rotary mounted feed roller driven by a first servomotor, said feed roller having a generally cylindrical shape and having a central axis about which it rotates;

a rotary mounted cutter drum, said cutter drum having a generally cylindrical shape and having a central axis about which it rotates, said cutter drum further having means for cutting labels from the label roll;

a rotary mounted vacuum drum, said vacuum drum having a generally cylindrical shape and having a central axis about which it rotates, said vacuum drum further having means for securing a cut label to the vacuum drum outer surface using suction;

said first servomotor rotatably mounted to said feed roller about said feed roller central axis;

said first servomotor electrically connected to said microprocessor whereby said microprocessor controls the rotational speed of said first servomotor and rotates said feed roller at varying surface speeds during the label cutting cycle, said feed roller surface speed remaining slightly less than said cutter drum speed, the surface speed of said feed roller tracking the surface speed of the cutter drum throughout the label cutting cycle;

a feed roller encoder means for sensing the surface speed and position of said feed roller, said feed roller encoder means electrically connected to said microprocessor;

a second servomotor rotatably mounted to said cutter drum about said cutter drum central axis, said second servomotor driving said cutter drum at variable rates of surface speed throughout a label cutting cycle, said label cutting cycle being a 360° rotation of a single blade cutter drum, said cutter drum rotating at substantially the same surface speed as the feed roller during the interval in the cycle in which said cutter drum is cutting a label, said cutter drum increasing surface speed to rotate at substantially the same surface speed as said vacuum drum during the interval in cycle in which said cutter drum is transferring a cut label to the vacuum drum and slowing down thereafter, such that the average surface speed of said cutter drum over a complete cycle is less than said vacuum drum surface speed but greater than the average feed roller surface speed;

said second servomotor electrically connected to said microprocessor whereby said microprocessor controls the rotational speed of said second servomotor;

a cutter drum encoder means for sensing the surface speed and position of said cutter drum, said cutter drum encoder means electrically connected to said microprocessor;

a third servomotor rotatably mounted to said vacuum drum about said vacuum drum central axis, said third servomotor driving said vacuum drum at a generally constant surface speed; and a vacuum drum encoder means for sensing the surface speed and position of said vacuum drum, said vacuum drum encoder means electrically connected to said microprocessor.

10. The apparatus of claim 9 further including:

a rotary mounted star wheel driven by a fourth servomotor, said star wheel having a means for aligning and spacing the containers before the containers are fed to said vacuum drum;

said fourth servomotor electrically connected to said microprocessor whereby said microprocessor controls the rotational speed of said fourth servomotor; and a star wheel encoder means for sensing the rotational speed and position of said star wheel, said star wheel encoder means electrically connected to said microprocessor.

* * * * *